United States Patent [19]

Lee

[11] Patent Number: 5,575,548
[45] Date of Patent: Nov. 19, 1996

[54] FULL COLOR THREE DIMENSIONAL PROJECTOR

[75] Inventor: Dong-Hee Lee, Kyeongsangnam-Do, Rep. of Korea

[73] Assignee: Daewoo Electronics Industrial Co., Ltd., Seoul, Rep. of Korea

[21] Appl. No.: 508,447

[22] Filed: Jul. 28, 1995

[30] Foreign Application Priority Data

Jul. 30, 1994 [KR] Rep. of Korea .................. 94-18853

[51] Int. Cl.⁶ ..................... G03B 35/22; G03B 21/28
[52] U.S. Cl. ................. 353/31; 353/8; 353/34; 359/465
[58] Field of Search .................... 353/8, 7, 20, 31, 353/33, 34, 37; 359/40, 48, 464, 465

[56] References Cited

U.S. PATENT DOCUMENTS 5,387,953 2/1995 Miuoura et al. ................ 353/20

FOREIGN PATENT DOCUMENTS

| 2658925 | 8/1991 | France | 353/20 |
| 4057045 | 2/1992 | Japan | 353/8 |
| 4052634 | 2/1992 | Japan | 353/8 |
| 5107661 | 4/1993 | Japan | 353/20 |

*Primary Examiner*—William Dowling
*Attorney, Agent, or Firm*—Beveridge, DeGrandi, Weilacher & Young, LLP

[57] ABSTRACT

Disclosed is a full color three dimensional projector comprising a light source for emitting light, a condensing means for condensing the emitted light and converting the light into a parallel light, a color separating means for separating the parallel light into red, blue and green color components, a first means for splitting the red component into polarized beams and for forming the optical image of the red component, a second means for splitting the blue component into polarized beams and for forming the optical image of the blue component and a third means for splitting the green component into polarized beams and for forming the optical image of the green component. The total size of the system can be reduced and the heat loss can be largely reduced.

9 Claims, 4 Drawing Sheets

FULL COLOR THREE DIMENSIONAL PROJECTOR

BACKGROUND OF THE INVENTION

1. Field of the Invention

The present invention relates to a full color three dimensional projector, and more particularly, to a full color three dimensional projector from which a full color image having polarity can be obtained by a single projector.

2. Description of the Prior Art

Recently, a three dimensional projector has been practically utilized for obtaining a three dimensional image by overlapping projecting polarized images to the human eyes. One approach has two projectors or display systems, where one projector provides a right eye display and the other a left eye display on a screen. Each display has its own polarization, for instance, "P" and "S", respectively, by means of a polarization plate provided in the projectors.

Each of the polarized images projected from the projectors are formed so as to provide optimized images through image alignment and/or image focusing on a screen. The polarized images are perceived by the eyes through polarized glasses for three dimensional viewing.

FIG. 1 is a schematic view for explaining the method for accomplishing three dimensional images in such a conventional three dimensional projector.

In the three dimensional projector illustrated in FIG. 1, a first projector 10 and a second projector 12 having respective polarization plates are provided and a screen 14 for displaying projected images from the first and second projectors 10 and 12 is installed.

In this case, two projectors are required to accomplish three dimensional image display and two light sources are needed. Accordingly, heat loss in the light sources is induced to deteriorate light efficiency. Moreover, since the three dimensional image is obtained by using a multitude of projectors and by carrying out image alignment and image focusing, the size of the projectors is large and control of each element is very difficult.

SUMMARY OF THE INVENTION

In view of the above-mentioned problems accompanied by the conventional technique, an object of the present invention is to provide a full color three dimensional projector having reduced size by which three dimensional image display can be accomplished using a single light source.

To accomplish the object, there is provided in the present invention a full color three dimensional projector comprising: a light source for emitting light including red, blue and green color components; a condensing means for condensing the emitted light and converting the light into a parallel light; a color separating means for separating the parallel light into the red, blue and green color components; a first means for splitting the red component into polarized beams and for forming the optical image of the red component; a second means for splitting the blue component into polarized beams and for forming the optical image of the blue component; a third means for splitting the green component into polarized beams and for forming the optical image of the green component; a first projecting means for projecting one color component among the three polarized color components to a screen; a second projecting means for projecting another color component among the three polarized color components to the screen; and a third projecting means for projecting the remaining color component among the three polarized color components to the screen.

Preferably, the second and third projecting means are the same, and a light combining means for combining two polarized color components among the three polarized color components is further included in front of the projecting means. As the light combining means, a dichroic mirror or a dichroic prism can be employed.

Further, the first means comprises: a first polarization coating layer for reflecting a first polarized component and for transmitting a second polarized component; a first converting means for converting the first polarized component reflected by a first polarization coating layer into the second polarized component; a first light valve modulator for providing a first optical image for the first polarized component; a second converting means for converting the second polarized component transmitted through the first polarization coating layer into the first polarized component; a second light valve modulator for providing a second optical image for the second polarized component. The second means comprises: a second polarization coating layer for reflecting a third polarized component and for transmitting a fourth polarized component; a third converting means for converting the third polarized component reflected by a second polarization coating layer into the fourth polarized component; a third light valve modulator for providing a third optical image for the third polarized component; a fourth converting means for converting the fourth polarized component transmitted through the second polarization coating layer into the third polarized component; a fourth light valve modulator for providing a fourth optical image for the fourth polarized component. The third means comprises: a third polarization coating layer for reflecting a fifth polarized component and for transmitting a sixth polarized component; a fifth converting means for converting the fifth polarized component reflected by a third polarization coating layer into the sixth polarized component; a fifth light valve modulator for providing a fifth optical image for the fifth polarized component; a sixth converting means for converting the sixth polarized component transmitted through the third polarization coating layer into the fifth polarized component; a sixth light valve modulator for providing a sixth optical image for the sixth polarized component.

In this case, it is preferred that the first, third and fifth polarized components have S orientations, and the second, fourth and sixth polarized components have P orientations. Further, it is also preferred that the first, second, third, fourth, fifth and sixth converting means are quarter wave plates.

As the color separating means, a dichroic prism having a red color component reflecting surface and a blue color component reflecting surface formed in a crossed X-shape can be used.

Polarization beam splitting prisms or polarization beam splitting plates can be employed in the first, second and third means, and projecting lenses can be preferably used as the first, second and third projecting means.

In the three dimensional projector according to the present invention, three dimensional image can be displayed by using a single projector. Therefore, manufacturing thereof is advantageous and the size thereof can be reduced.

BRIEF DESCRIPTION OF THE DRAWINGS

The above object and advantages of the present invention will become more apparent by describing in detail a preferred embodiment thereof with reference to the attached drawings, in which.

DESCRIPTION OF THE PREFERRED EMBODIMENT

A preferred embodiment of the present invention will be described in detail referring to the attached drawings.

Figure 1:
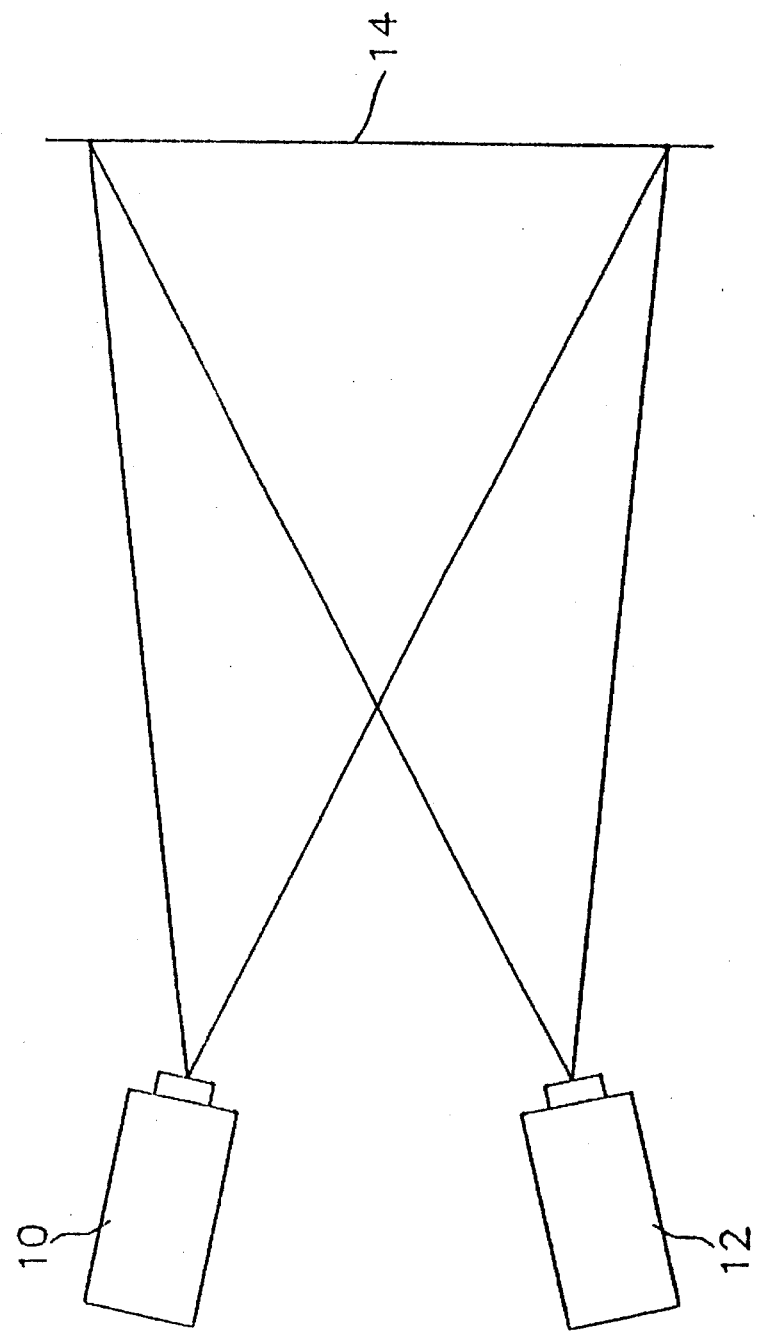
FIG. 1 is a schematic view for explaining the method for accomplishing a three dimensional image in the conventional three dimensional projector.
Figure 2:
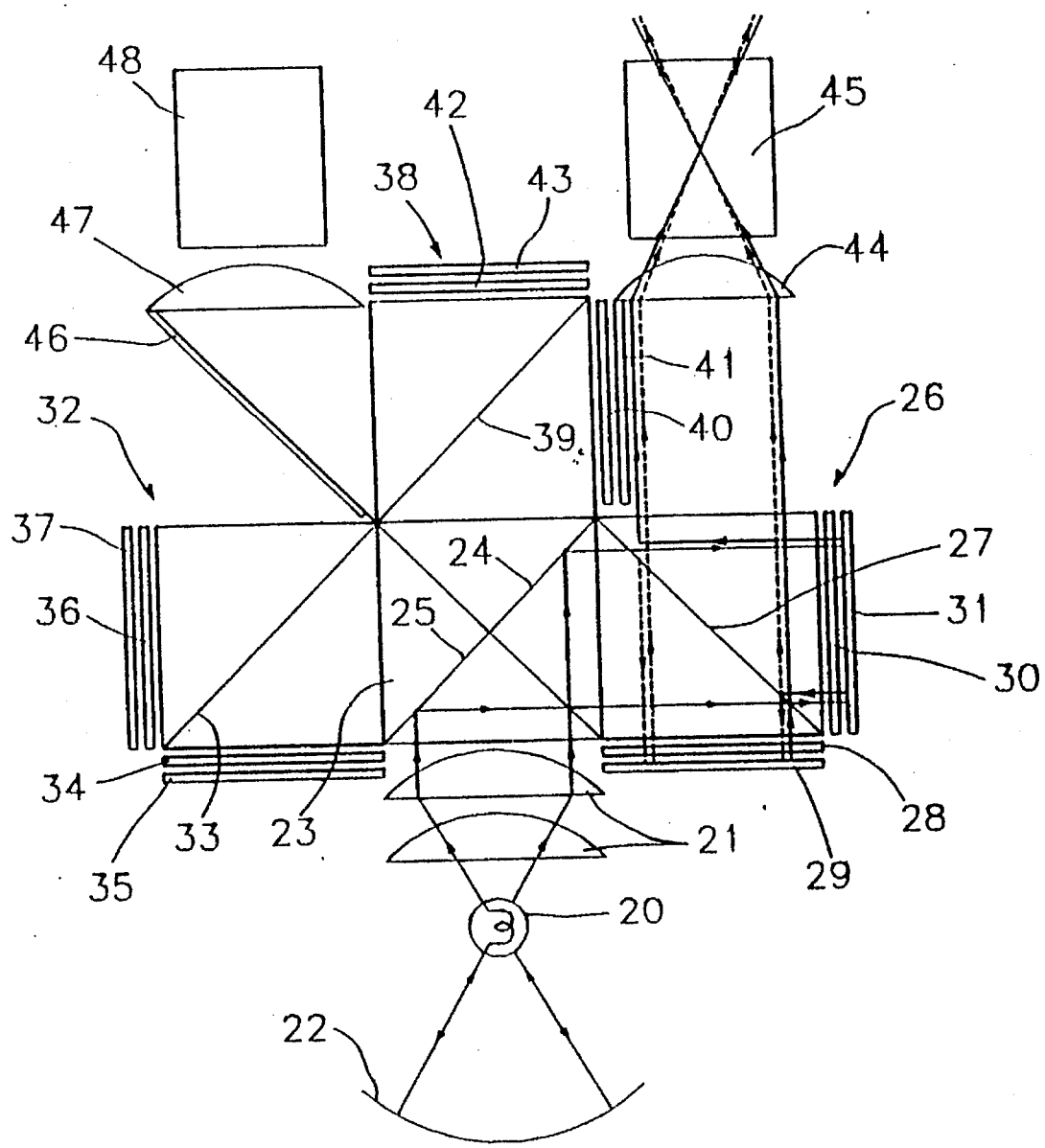
FIG. 2 is a constitution diagram for explaining elements and operation along the separating path of the red color component in the three dimensional projector according to an embodiment of the present invention.
Figure 3:
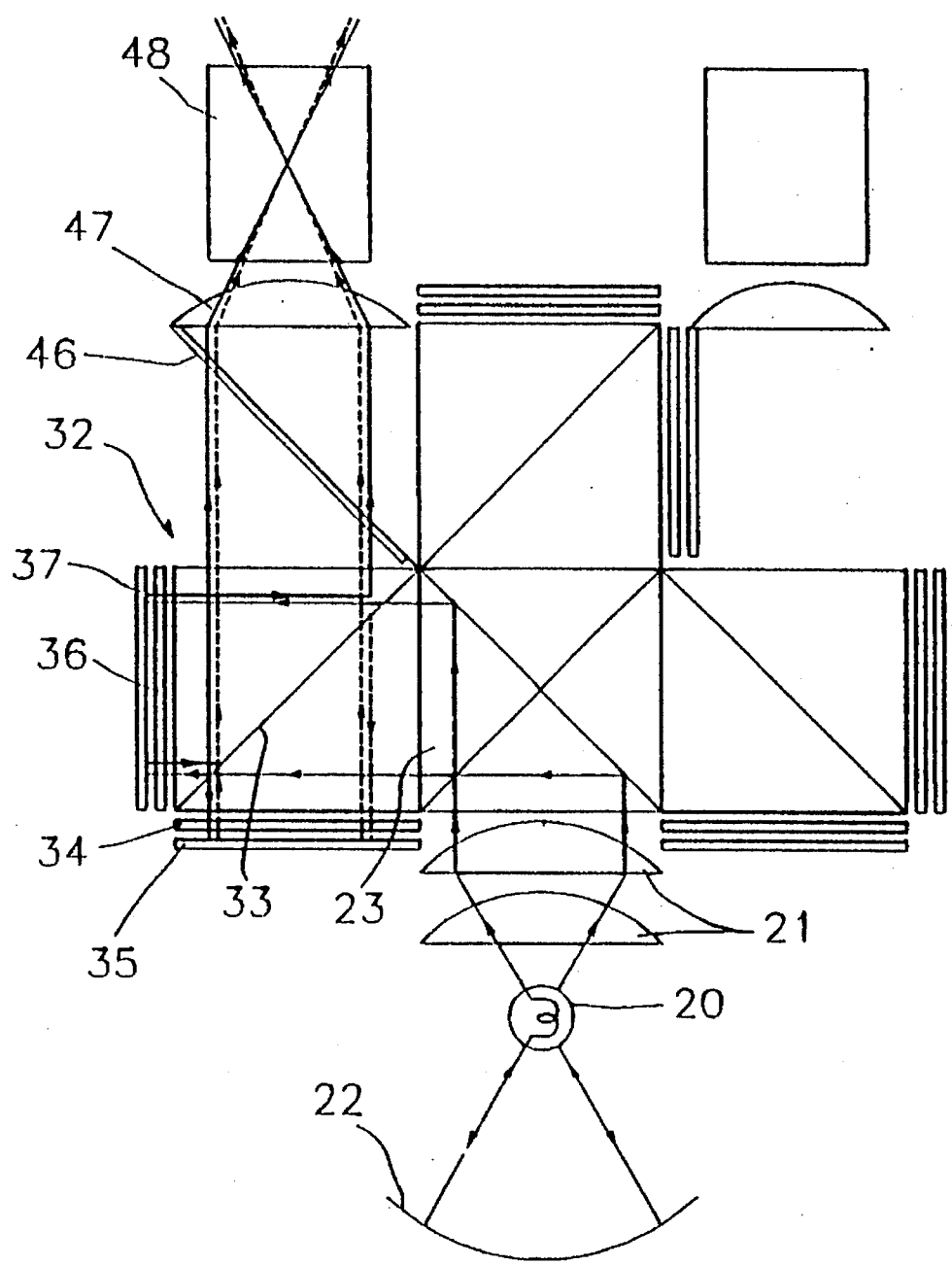
FIG. 3 is a constitution diagram for explaining elements and operation along the separating path of the blue color component in the three dimensional projector according to an embodiment of the present invention.
Figure 4:
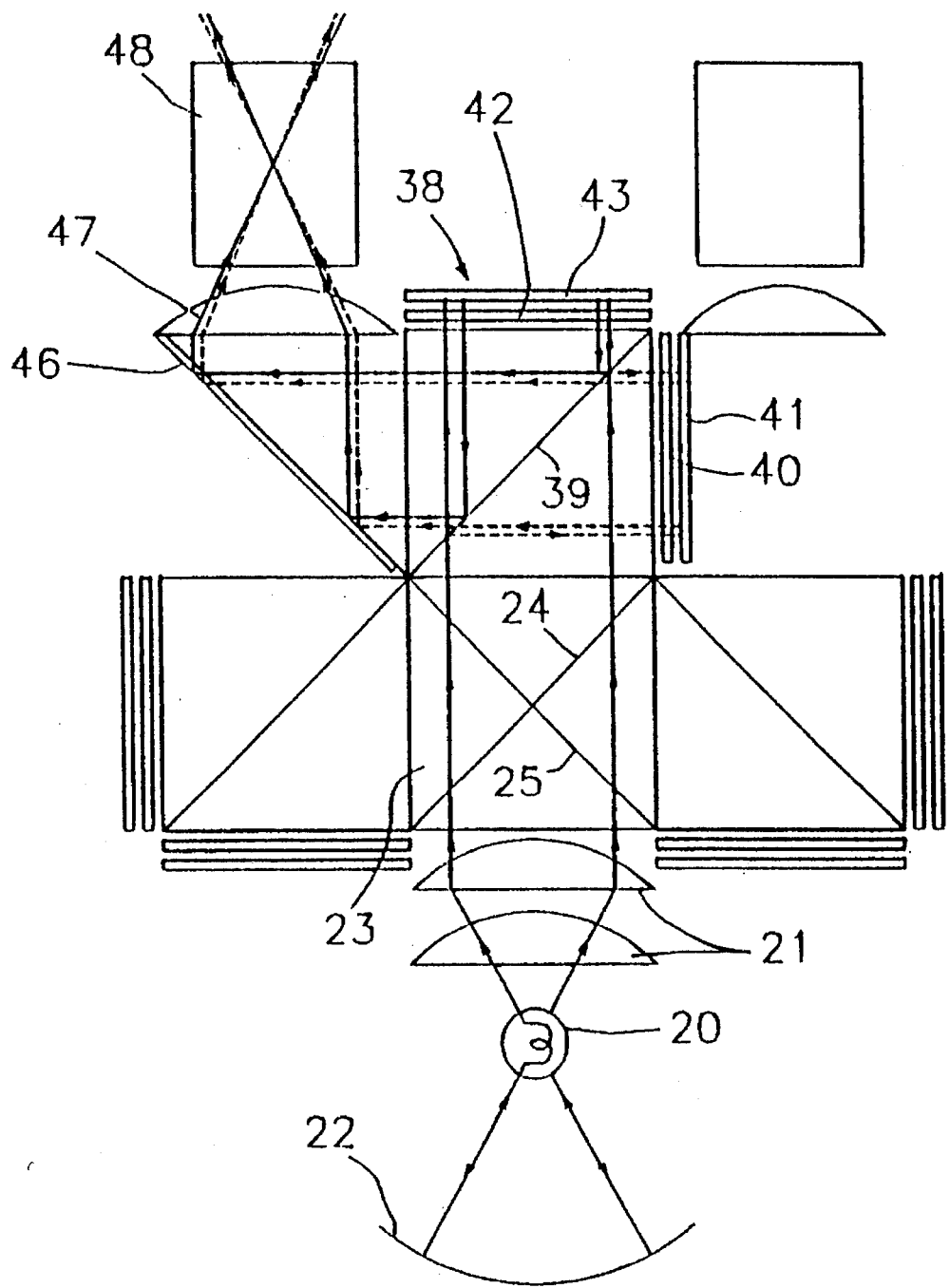
FIG. 4 is a constitution diagram for explaining elements and operation along the separating path of the green color component in the three dimensional projector according to an embodiment of the present invention.

FIGS. 2–4 are constitution diagrams for explaining elements and operation in the three dimensional projector according to an embodiment of the present invention.

In the projector according to this embodiment, a halogen lamp 20 for emitting white color is provided as a light source for emitting light including red, blue and green color components.

Condensing lenses 21 for condensing the light emitted from light source 20 and for converting this light into a parallel light, and reflecting mirrors 22 in concave shapes are provided as condensing elements. Further, a dichroic prism 23 as a color separating device for separating the parallel light into the red, blue and green color components is provided. Dichroic prism 23 includes a flat red color reflecting surface 24 and a flat blue color reflecting surface 25 in a crossed X-shape.

Apparatuses are installed for splitting each color component into polarized beams and for forming optical images. A first polarization beam splitting prism 26 for red color component polarization beam splitting and forming the optical image thereof, a second polarization beam splitting prism 32 for blue color component polarization beam splitting and forming the optical image thereof and a third polarization beam splitting prism 38 for green color component polarization beam splitting and forming the optical image thereof are provided.

In particular, first polarization beam splitting prism 26 for splitting the red color component separated by red color component reflecting surface 24 in dichroic prism 23 and for forming the optical image, includes a first polarization coating layer 27 for reflecting the red color component having S orientation, while transmitting the red color component having P orientation, a first quarter wave plate 28 for converting the red color component having S orientation reflected by first polarization coating layer 27 into the red color component having P orientation by rotating the red color component having S orientation by 90° during passing to and from first quarter wave plate 28, a first light valve modulator 29 for forming a first optical image, a second quarter wave plate 30 for converting the red color component having P orientation transmitted through first polarization coating layer 27 into the red color component having S orientation by rotating the red color component having P orientation by 90° during passing to and from second quarter wave plate 30, and a second light valve modulator 31 for forming a second optical image.

Second polarization beam splitting prism 32 for splitting the blue color component separated by blue color component reflecting surface 25 in dichroic prism 23 and for forming the optical image has similar elements as in first polarization beam splitting prism 26. That is, this apparatus includes a second polarization coating layer 33 for reflecting the blue color component having S orientation, while transmitting the blue color component having P orientation, a third quarter wave plate 34 for converting the blue color component having S orientation reflected by second polarization coating layer 33 into the blue color component having P orientation by rotating the blue color component having S orientation by 90° during passing to and from third quarter wave plate 34, a third light valve modulator 35 for forming a third optical image, a fourth quarter wave plate 36 for converting the blue color component having P orientation transmitted through second polarization coating layer 33 into the blue color component having S orientation by rotating the blue color component having P orientation by 90° during passing to and from fourth quarter wave plate 36, and a fourth light valve modulator 37 for forming a fourth optical image.

Next, third polarization beam splitting prism 38 for splitting the green color component transmitted through dichroic prism 23 and for forming optical image has similar elements as in first and second polarization beam splitting prisms 26 and 32. That is, this apparatus includes a third polarization coating layer 39 for reflecting the green color component having S orientation, while transmitting the green color component having P orientation, a fifth quarter wave plate 40 for converting the green color component having S orientation reflected by third polarization coating layer 39 into the green color component having P orientation by rotating the green color component having S orientation by 90° during passing to and from fifth quarter wave plate 40, a fifth light valve modulator 41 for forming a fifth optical image, a sixth quarter wave plate 42 for converting the green color component having P orientation transmitted through third polarization coating layer 39 into the green color component having S orientation by rotating the green color component having P orientation by 90° during passing to and from sixth quarter wave plate 42, and a sixth light valve modulator 43 for forming a sixth optical image.

The projector according to this embodiment further includes a first collecting lens 44 for collecting the red color components outputted from first polarization beam splitting prism 26 and a first projecting lens 45 for projecting the collected components onto a screen. Further, a dichroic mirror 46 as a light combining device for transmitting the blue color components outputted from second polarization beam splitting prism 32 and for reflecting the green color components outputted from third polarization beam splitting prism 38, a second collecting lens 47 for collecting the combined blue and green color components from light combining device 46 and a second projecting lens 48 for projecting the collected components onto the screen are provided.

Process for forming the three dimensional image in the three dimensional projector having the above mentioned elements will be described in detail.

First, a light including red, blue and green color components is emitted from halogen light source 20 and condensed by reflecting mirror 22 and condensing lenses 21. The condensed light is converted into a parallel light during passing through condensing lenses 21 and then is incident into dichroic prism 23.

The red color component among the light incident into dichroic prism 23 is reflected by red color component reflecting surface 24 toward first polarization beam splitting prism 26 as shown in FIG. 2, the blue color component is reflected by blue color component reflecting surface 25 toward second polarization beam splitting prism 32 as shown in FIG. 3, and the green color component passes through dichroic prism 23 toward third polarization beam splitting prism 38 as shown in FIG. 4.

The path of the red color component incident into first polarization beam splitting prism 26 will be described referring to FIG. 2.

The red color component having S orientation is reflected downwards by first polarization coating layer 27 and is converted into the red color component having P orientation by first quarter wave plate 28 through rotation by 90°. A first optical image is formed by information applied into first light valve modulator 29 and is reflected again to be passed through first polarization coating layer 27. Meanwhile, the red color component having P orientation passes through first polarization coating layer 27 and is converted into the red color component having S orientation by second quarter wave plate 30 by 90°. A second optical image is formed by information applied into second light valve modulator 31 and is reflected to be reflected again by first polarization coating layer 27 upwards.

All the red color components are collected by first collecting lens 44 and projected onto the screen by first projecting lens 45.

The path of the blue color component incident into second polarization beam splitting prism 32 will be described referring to FIG. 3.

The blue color component having S orientation is reflected downwards by second polarization coating layer 33 and is converted into the blue color component having P orientation by third quarter wave plate 34 through rotation by 90°. A third optical image is formed by information applied into third light valve modulator 35 and is reflected again to be passed through second polarization coating layer 33. Meanwhile, the blue color component having P orientation passes through second polarization coating layer 33 and is converted into the blue color component having S orientation by fourth quarter wave plate 36 by 90°. A fourth optical image is formed by an information applied into fourth light valve modulator 36 and is reflected to be reflected again by second polarization coating layer 33 upwards.

The path of the green color component incident into third polarization beam splitting prism 38 will be described referring to FIG. 4.

The green color component having S orientation is reflected toward the right side by third polarization coating layer 39 and is converted into the green color component having P orientation by fifth quarter wave plate 40 through rotation by 90°. A fifth optical image is formed by an information applied into fifth light valve modulator 41 and is reflected again to be passed through third polarization coating layer 39. Meanwhile, the green color component having P orientation passes through third polarization coating layer 39 and is converted into the green color component having S orientation by sixth quarter wave plate 42 by 90°. A sixth optical image is formed by information applied into sixth light valve modulator 43 and is reflected to be reflected again by third polarization coating layer 39 toward the left side.

All the blue color components from second polarization beam splitting apparatus 32 and all the green color components from third polarization beam splitting apparatus 38 are combined by dichroic mirror 46 as the light combining device. When the red color component from first polarization beam splitting prism 32 is projected onto the screen through first collecting lens 44 and first projecting lens 45, the combined blue and green components are collected by second collecting lens 47 and projected onto the screen by second projecting lens 48.

The images formed by the projected components are perceived by the eyes through polarized glasses for full color three dimensional view.

The three dimensional image can be obtained using a single projector by separating each color component into polarized beams using each polarization beam splitting apparatus, providing optical image and projecting the image onto the screen through a multitude of projecting lenses.

In the above embodiment, the polarized blue and green color components were combined and projected. However, any two color components among the red, blue and green can be combined.

As described above, since the image projection by a three-beam type single projector can be accomplished according to the three dimensional projector of the present invention, the total size of the system can be reduced. In addition, since only a single light source is required, the heat loss can be largely reduced.

While the present invention is described in detail referring to the attached embodiment, various modifications, alternate constructions and equivalents may be employed without departing from the true spirit and scope of the present invention.

What is claimed is:

1. A full color three dimensional projector, comprising:

a light source for emitting light including red, blue and green color components;

a condensing means for condensing emitted light and converting light into parallel light;

a color separating means for separating parallel light into said red, blue and green color components;

a first means for splitting said red color component into polarized beams and for forming an optical image of said red color component;

a second means for splitting said blue color component into polarized beams and for forming an optical image of said blue color component;

a third means for splitting said green component into polarized beams and for forming an optical image of said green component;

a first projecting means for projecting one color component among three polarized color components to a screen;

a second projecting means for projecting another color component among three polarized color components to said screen; and a third projecting means for projecting a remaining color component among three polarized color components to said screen, wherein said first means comprises:
a first polarization coating layer for reflecting a first beam having a first polarization orientation and for transmitting a second beam having a second polarization orientation;

a first converting means for converting said first beam reflected by said first polarization coating layer into a beam having said second polarization orientation;

a first light valve modulator for providing a first optical image for said first beam;

a second converting means for converting said second beam transmitted through said first polarization coating layer into a beam having said first polarization orientation;

a second light valve modulator for providing a second optical image for said second beam;

said second means comprises:

a second polarization coating layer for reflecting a third beam having a third polarization orientation and for transmitting a fourth beam having a fourth polarization orientation;

a third converting means for converting said third beam reflected by said second polarization coating layer into a beam having said fourth polarization orientation;

a third light valve modulator for providing a third optical image for said third beam;

a fourth converting means for converting said fourth beam transmitted through said second polarization coating layer into a beam having said third polarization orientation;

a fourth light valve modulator for providing a fourth optical image for said fourth beam, and said third means comprises:

a third polarization coating layer for reflecting a fifth beam having a fifth polarization orientation and for transmitting a sixth beam having a sixth polarization orientation;

a fifth converting means for converting said fifth beam reflected by said third polarization coating layer into a beam having said sixth polarization orientation;

a firth light valve modulator for providing a fifth optical image for said fifth beam;

a sixth converting means for converting said sixth beam transmitted through said third polarization coating layer into a beam having said fifth polarization orientation; and a sixth light valve modulator for providing a sixth optical image for said sixth beam.

2. The full color three dimensional projector of claim 1, wherein said first, third and fifth polarized components have S orientations, and said second, fourth and sixth polarized components have P orientations.

3. The full color three dimensional projector of claim 1, wherein said first, second, third, fourth, fifth and sixth converting means are quarter wave plates.

4. The full color three dimensional projector of claim 1, wherein said color separating means is a dichroic prism having a red color component reflecting surface and a blue color component reflecting surface formed in an X-shape.

5. The full color three dimensional projector of claim 1, wherein said first, second and third means comprise polarization beam splitting prisms or polarization beam splitting plates.

6. The full color three dimensional projector of claim 1, wherein said first, second and third projecting means are projecting lenses.

7. The full color three dimensional projector of claim 1, wherein said second and third projecting means are the same, and a light combining means for combining two polarized color components among the three polarized color components is further installed in front of said second and third projecting means.

8. The full color three dimensional projector of claim 1, wherein said light combining means is a dichroic mirror or a dichroic prism.

9. A full color three dimensional projector comprising:

a light source for emitting light including a red color component, a blue color component and a green color component;

a condensing means for condensing an emitted light and converting into a parallel light;

a dichroic prism for separating said parallel light into a red color component, a blue color component and a green color component;

a first polarization coating layer for reflecting a red color component having S orientation and for transmitting a red color component having P orientation;

a first quarter wave plate for converting said red color component having S orientation reflected by said first polarization coating layer into a red color component having P orientation;

a first light valve modulator for providing a first optical image for said red color component having S orientation;

a second quarter wave plate for converting said red color component having P orientation transmitted through said first polarization coating layer into a red color component having S orientation;

a second light valve modulator for providing a second optical image for said red color component having P orientation;

a second polarization coating layer for reflecting a blue color component having S orientation and for transmitting a blue color component having P orientation;

a third quarter wave plate for converting said blue color component having S orientation reflected by said second polarization coating layer into a blue color component having P orientation;

a third light valve modulator for providing a third optical image for said blue color component having S orientation;

a fourth quarter wave plate for converting said blue color component having P orientation transmitted through said second polarization coating layer into a blue color component having S orientation;

a fourth light valve modulator for providing a fourth optical image for said blue color component having P orientation;

a third polarization coating layer for reflecting a green color component having S orientation and for transmitting a green color component having P orientation;

a fifth quarter wave plate for converting said green color component having S orientation reflected by said third polarization coating layer into a green color component having P orientation;

a fifth light valve modulator for providing a fifth optical image for said green color component having S orientation;

a sixth quarter wave plate for converting said green color component having P orientation transmitted through said third polarization coating layer into a green color component having S orientation;

a sixth light valve modulator for providing a sixth optical image for said green color component having P orientation;

a first collecting lens for collecting said red color components from said first light valve modulator and said second light valve modulator;

a first projecting lens for projecting said collected red color components onto a screen;

a dichroic mirror for combining said blue color component from said third light valve modulator and said fourth light valve modulator and said green color component from the fifth light valve modulator and said sixth light valve modulator;

a second collecting lens for collecting components combined by said dichroic mirror; and a second projecting lens for projecting components collected by said second collecting lens onto said screen.

* * * * *